United States Patent
Keite-Telgenbüsher et al.

(10) Patent No.: US 9,422,466 B2
(45) Date of Patent: Aug. 23, 2016

(54) TEMPERATURE-STABLE CROSS-LINKABLE ADHESIVE COMPOUND WITH HARD AND SOFT BLOCKS

(71) Applicant: tesa SE, Hamburg (DE)

(72) Inventors: Klaus Keite-Telgenbüsher, Hamburg (DE); Jan Ellinger, Hamburg (DE); Judith Grünauer, Hamburg (DE); Thorsten Krawinkel, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 14/389,529

(22) PCT Filed: Mar. 25, 2013

(86) PCT No.: PCT/EP2013/056277
§ 371 (c)(1),
(2) Date: Sep. 30, 2014

(87) PCT Pub. No.: WO2013/156267
PCT Pub. Date: Oct. 24, 2013

(65) Prior Publication Data
US 2015/0064462 A1    Mar. 5, 2015

(30) Foreign Application Priority Data

Apr. 17, 2012 (DE) .......... 10 2012 206 265

(51) Int. Cl.
| | |
|---|---|
| *C09J 7/02* | (2006.01) |
| *C09J 153/00* | (2006.01) |
| *C09J 11/06* | (2006.01) |
| *C09J 153/02* | (2006.01) |
| *B05D 3/02* | (2006.01) |
| *C08K 5/00* | (2006.01) |

(52) U.S. Cl.
CPC ............. *C09J 153/00* (2013.01); *B05D 3/0218* (2013.01); *B05D 3/0254* (2013.01); *C09J 7/02* (2013.01); *C09J 7/0221* (2013.01); *C09J 11/06* (2013.01); *C09J 153/025* (2013.01); *C08K 5/0025* (2013.01); *C08K 5/0091* (2013.01); *C09J 2453/00* (2013.01); *Y10T 428/2857* (2015.01)

(58) Field of Classification Search
CPC .................. C09J 153/00; C09J 7/02
See application file for complete search history.

(56) References Cited

U.S. PATENT DOCUMENTS

| | | | |
|---|---|---|---|
| 3,642,953 A | | 2/1972 | O'Neill et al. |
| 5,066,694 A | * | 11/1991 | Agarwal et al. ............ 524/60 |
| 8,557,084 B2 | | 10/2013 | Keite-Telgenbüsher et al. |
| 2007/0021569 A1 | | 1/2007 | Willis et al. |
| 2007/0270553 A1 | * | 11/2007 | Bohm et al. ............... 525/314 |
| 2010/0012271 A1 | | 1/2010 | Krawinkel |
| 2010/0048817 A1 | | 2/2010 | Dado et al. |
| 2010/0203785 A1 | | 8/2010 | Willis et al. |
| 2011/0036496 A1 | | 2/2011 | Keite-Telgenbüsher et al. |
| 2011/0036623 A1 | | 2/2011 | Keite-Telgenbüsher et al. |

FOREIGN PATENT DOCUMENTS

| | | | |
|---|---|---|---|
| CN | 101228192 A | 7/2008 | |
| DE | 10 2009 036 968 A1 | 2/2011 | |
| DE | 10 2009 036 970 A1 | 2/2011 | |
| EP | 1 857 515 A2 | 11/2007 | |
| JP | 2010505978 A | 2/2010 | |
| WO | 2007010039 | 1/2007 | |
| WO | WO 2007/010039 A1 * | 1/2007 | ............ C08F 8/36 |

OTHER PUBLICATIONS

International Search Report dated Jul. 9, 2013, mailed Jul. 17, 2013.
German Search Report dated Nov. 23, 2012.
English Translation of Chinese Office Action dated Nov. 11, 2015.

* cited by examiner

*Primary Examiner* — Robert Harlan
(74) *Attorney, Agent, or Firm* — Norris McLaughlin & Marcus P.A.

(57) ABSTRACT

Temperature-stable adhesive compound, comprising (i) block copolymers having a construction A-B-A, $(A-B)_n$, $(A-B)_n X$, or $(A-B-A)_n X$, where X is the radical of a coupling reagent, n is an integer between 2 and 10, A is a polymer block of a vinylaromatic, and B is a polymer block of an alkene or diene, at least some of the A blocks being sulfonated, and optionally diblock copolymers of the form A-B, and
(ii) at least one tackifier resin, and
(iii) at least one metal complex with a substitutable complexing agent.

21 Claims, 2 Drawing Sheets

TEMPERATURE-STABLE CROSS-LINKABLE ADHESIVE COMPOUND WITH HARD AND SOFT BLOCKS

This is a 371 of PCT/EP2013/056277 filed 25 Mar. 2013, which claims foreign priority benefit under 35 U.S.C. 119 of German Patent Application 10 2012 206 265.3 filed 17 Apr. 2012, the entire contents of which are incorporated herein by reference.

The present invention relates to an adhesive, more particularly a temperature-stable adhesive, featuring increased cohesion in conjunction with high bond strength, and comprising (i) block copolymers and also mixtures thereof, having a construction A-B-A, $(A-B)_n$, $(A-B)_nX$, or $(A-B-A)_nX$, where X is the radical of a coupling reagent, n is an integer between 2 and 10, A is a polymer block of a vinylaromatic, and B is a polymer block of an alkene or diene, and this polymer block may be at least partly hydrogenated, with the condition that at least some of the A blocks are sulfonated, and optionally as an admixture component comprises diblock copolymers of the form A-B, and (ii) at least one tackifier resin, and (iii) at least one metal complex with a substitutable complexing agent.

BACKGROUND OF THE INVENTION

Pressure-sensitive adhesives (PSAs) are adhesives which even under a relatively weak applied pressure permit a durable connection with the substrate and which after service can be detached from the substrate again substantially without residue. PSAs are permanently pressure-sensitively adhesive at room temperature, thus having a sufficiently low viscosity and a high tack, meaning that they wet the surface of the respective substrate even under low applied pressure. The adhesive bonding capacity of the adhesives and their redetachability derive from their adhesive properties and from their cohesive properties. A variety of compounds are contemplated as a basis for PSAs.

Adhesive tapes furnished with PSAs, referred to as pressure-sensitive adhesive tapes, are presently in diverse use within the industrial and household spheres. Pressure-sensitive adhesive tapes consist customarily of a carrier film furnished on one or both sides with a PSA. There are also pressure-sensitive adhesive tapes which consist exclusively of a PSA layer and no carrier film, these being known as transfer tapes. The composition of the pressure-sensitive adhesive tapes may vary greatly and is dependent on the particular requirements of the various applications. The carriers consist customarily of polymeric films such as polypropylene, polyethylene, or polyester, for example, or else of paper, woven fabric, or nonwoven material. The self-adhesives or PSAs are based generally on acrylate copolymers, silicones, natural rubber, synthetic rubber, styrene block copolymers, or polyurethanes.

There is a need for adhesive tapes which exhibit a very high bonding strength, but also do not lose their cohesion at elevated temperatures. In the case of adhesive bonds in the exterior sector or in automobiles, in particular, temperatures of more than 60° C. to 70° C. may occur. For adhesive tapes with particularly high holding powers, especially in the consumer segment, adhesives based on styrene block copolymers are frequently employed. An advantage of these adhesives is that they are able to exhibit very high bonding strength in tandem with very high cohesion. As a result of a high tack, bonds even to rough substrates are reliably possible.

Typically finding use are linear or radial block copolymers based on polystyrene blocks and polybutadiene blocks and/or polyisoprene blocks, in other words, for example, radial styrene-butadiene $(SB)_n$ and/or linear styrene-butadiene-styrene (SBS) and/or linear styrene-isoprene-styrene (SIS) block copolymers.

The products that are on the market with PSAs based on styrene block copolymers exhibit weaknesses in their bonding strength at temperatures above 50° C. Especially when being used for bonding articles of moderate weight, the softening of the hard phases consisting principally of polystyrene (block polystyrene domains) results in cohesive failure of the pressure-sensitive adhesive strips.

Bond failure occurs to a significantly greater extent in particular in the case of a tipping shear load (when a torque is active, such as in a hook bond, for example) than in the case of a pure shear load.

It is an object of the invention to provide an adhesive which exhibits excellent temperature stability. The adhesive is in particular to be a pressure-sensitive adhesive, with a tack across a broad temperature range; more particularly, the adhesive is to be suitable for temperature-stable adhesive tapes. A further object is to develop an adhesive which exhibits good bonding strength at high temperature. Another object is to develop an adhesive which is able to bond different articles durably to one another, which has good performance at high temperatures, more particularly good bonding strength at high temperatures, preferably above 100° C., and which is easy to handle in bonding operations, which permits flexible and clean processing, and which is nevertheless easy for the manufacturer to process.

SUMMARY OF THE INVENTION

This object is achieved by means of an adhesive as specified in the main claim. The dependent claims describe advantageous embodiments of the invention. The object is further achieved by an adhesive which is obtained in accordance with the process of the invention, and also by the process of the invention for producing the adhesive itself. The objects are achieved, furthermore, by the use as stated in the claims for the adhesive of the invention.

For reasons given above, it was surprising that with the at least partly sulfonated adhesive of the invention, it is possible to achieve excellent bonding strengths, not least in adhesive tapes, with the adhesive also having an outstanding temperature stability.

The invention provides adhesives, preferably pressure-sensitive adhesives, more particularly temperature-stable adhesives, comprising (i) block copolymers and also mixtures thereof having a construction A-B-A, $(A-B)_n$, $(A-B)_nX$, or $(A-B-A)_nX$, where X is the radical of a coupling reagent, n is an integer between 2 and 10, it being possible more particularly for n to be selected independently in each case from 2, 3, 4, 5, 6, 7, 8, 9, and 10, A is a polymer block of a vinylaromatic, and B is a polymer block of an alkene or diene, it being possible for this polymer block B to be preferably at least partly, more preferably fully, hydrogenated, and at least some of the A blocks being sulfonated, and optionally comprising as an admixture component diblock copolymers of the form A-B, and (ii) at least one tackifier resin, and (iii) at least one metal complex with a substitutable complexing agent.

DETAILED DESCRIPTION

The adhesive of the invention is a crosslinkable adhesive, more particularly a coordinatively crosslinkable adhesive, preferably based on sulfonated vinylaromatic block copolymers, having good processability and coatability. They are notable, moreover, for good product properties in respect of adhesion and cohesion, and exhibit outstanding bonding strengths even at high temperatures. On the basis of the crosslinking, the high temperature stability in the adhesive can be adjusted.

At room temperature, block copolymers having soft and hard components with significantly divergent $T_g$ values generally form a domain structure, which in the context of adhesives is a target for obtaining permeation-inhibiting properties. The unmodified block copolymers of styrene blocks and diene/butylene/isobutylene/ethylene/propylene blocks are stable to shearing usually only to 85° C. or to 100° C.; within this temperature range, the domain structures begin to break up.

In accordance with the invention it has been found that the modification, more particularly sulfonation, of the hard blocks of the block copolymers, preferably of the aromatics of the alkene-functionalized aromatics such as vinylaromatics, also permits good flow-on in the uncrosslinked state. Slightly improved shear properties relative to the unmodified block copolymers are observed from the sulfonation, even without crosslinking. Subsequent crosslinking of the sulfonic acid groups or sulfonic acid derivatives such as esters, via coordinative crosslinking with a metal, preferably with aluminum of an aluminum chelate, results in a significant improvement in the shear properties of the crosslinked adhesives. The metal in the metal chelate is selected according to subsequent application, in order to prevent unwanted contamination with metals in sensitive applications.

Preferably at least some of the A blocks of the (i) block copolymers are sulfonated; these block copolymers are also identified as sulfonated copolymer. In the sulfonated block copolymers, at least some of the polymer blocks A are sulfonated on the aromatic moiety. The adhesive accordingly comprises a block copolymer or a mixture with blocks comprising sulfonated A blocks and unsulfonated blocks B, more particularly with crosslinked sulfonated A blocks, very preferably crosslinked via metals, particularly in accordance with metal chelates of the general formula I. With preference, furthermore, there are additionally block copolymers present as unsulfonated copolymers, having A blocks and B blocks in each case independently. As an admixture component of the form A-B, there may additionally be blocks present independently in the adhesive, as A' blocks and B' blocks.

Customary coupling reagents for the production of diblock, triblock and also multiblock and star block copolymers are known to the skilled person. To name but a few, by way of example, 2-vinylpyridine, 1,4-di(bromomethyl)benzene, dichloromethylsilane, or 1,2-bis-(trichlorosilyl)ethane are stated, without the coupling reagents being confined to these. After coupling has taken place, X remains as a residue of these coupling reagents.

The invention further provides adhesives whose blocks have different $T_g$s (determinable via DSC) and which allow the formation of domains as a result of insolubility of the individual phases in one another. As a result of the formation of these domains within a block copolymer, very good adhesion can be achieved at room temperature. It is therefore preferred if in the copolymer (i) the A blocks in each case independently have a $T_g$ of more than 40° C. and the B blocks in each case independently have a $T_g$ of less than 0° C. The A blocks preferably have a $T_g$ of more than 40° C. even prior to the sulfonation.

A further characteristic of preferred adhesives is that the polymeric A blocks in the block copolymer are independently a homopolymer or copolymer which has been formed from vinylaromatics such as styrene, or styrene derivatives and/or α-methylstyrene, o- or p-methylstyrene, 2,5-dimethylstyrene, p-methoxystyrene and/or tert-butylstyrene.

In order to set the high temperature stabilities according to the invention, the aim is for a certain degree of sulfonation of the copolymers. Preferred adhesives are distinguished by a defined amount of sulfonated aromatics, in other words an amount of polymerized and sulfonated vinylaromatics. The sulfonated copolymer preferably has sulfonated polymeric A blocks in which the aromatics are sulfonated to an extent of greater than or equal to 0.5 mol %, per mole of the monomer unit, in other words of the vinylaromatics, based on the total monomer units of the A blocks of the sulfonated copolymers, more particularly greater than or equal to 4 mol % to 50 mol %, preferably between 0.5 to 50 mol %, preferably 2 to 40 mol %, more preferably 5 to 30 mol %, very preferably 10 to 25 mol %, in accordance with the invention 12 to 17 mol %, alternatively around 15 mol % with a fluctuation range of plus/minus 2 mol %, preferably 1 mol %. In case of values in the range from 10 to 25 mol %, preferably from 12 to 17 mol %, particularly effective crosslinking can be achieved, in order to obtain a high temperature stability, without the adhesive losing bond strength. The sulfonation takes place preferably only on the aromatic moiety of the A blocks.

Block copolymers are known to the skilled person. To name but a few, by way of example, 2-vinylpyridine, 1,4-di (bromomethyl)benzene, dichlorodimethylsilane, or 1,2-bis-(trichlorosilyl)ethane are stated, without the coupling reagents being confined to these. After coupling has taken place, X remains as a residue of these coupling reagents.

The invention further provides adhesives whose blocks have different $T_g$s (determinable via DSC) and which allow the formation of domains as a result of insolubility of the individual phases in one another. As a result of the formation of these domains within a block copolymer, very good adhesion can be achieved at room temperature. It is therefore preferred if in the copolymer (i) the A blocks in each case independently have a $T_g$ of more than 40° C. and the B blocks in each case independently have a $T_g$ of less than 0° C. The A blocks preferably have a $T_g$ of more than 40° C. even prior to the sulfonation.

A further characteristic of preferred adhesives is that the polymeric A blocks in the block copolymer are independently a homopolymer or copolymer which has been formed from vinylaromatics such as styrene, or styrene derivatives and/or α-methylstyrene, o- or p-methylstyrene, 2,5-dimethylstyrene, p-methoxystyrene and/or tert-butylstyrene.

In order to set the high temperature stabilities according to the invention, the aim is for a certain degree of sulfonation of the copolymers. Preferred adhesives are distinguished by a defined amount of sulfonated aromatics, in other words of polymerized and sulfonated vinylaromatics. The sulfonated copolymer preferably has sulfonated polymeric A blocks in which the aromatics are sulfonated to an extent of greater than or equal to 0.5 mol %, per mole of the monomer unit, in other words of the vinylaromatics, based on the total monomer units of the A blocks of the sulfonated copolymers, more particularly greater than or equal to 4 mol % to 50 mol %, preferably between 0.5 to 50 mol %, preferably 2 to 40 mol %, more preferably from 5 to 30 mol %, very preferably 10 to 25 mol %, in accordance with the invention 12 to 17 mol %, alternatively around 15 mol % with a fluctuation range of plus/minus 2 mol %, preferably 1 mol %. In the case of values in the range from 10 to 25 mol %, preferably from 12 to 17 mol %, particularly effective crosslinking can be achieved, in order to attain a high temperature stability, without the adhesive losing bond strength. The sulfonation takes place preferably only on the aromatic moiety of the A blocks.

The adhesive further comprises preferably independently unsulfonated block copolymers and optionally at least one admixture component whose A blocks are likewise derived from vinylaromatics such as styrene. The B blocks (soft block) of these copolymers are, independently, polymers derived from isoprene, butadiene, isobutylene, ethylene and/or propylene, and are preferably substantially fully hydrogenated.

Further provided by the invention is an adhesive which comprises (ii) at 10 to 60 wt %, at least one tackifier resin, preferably 20 to 55 wt %, more particularly a hydrocarbon resin, such as a partly or fully hydrogenated hydrocarbon resin preferably at greater than or equal to 30 to 60 wt %, and (iii) at least one metal complex with a substitutable complexing agent, more particularly of the formula I, and optionally (iv) up to 20 wt % of a plasticizer, more particularly 5 to 15 wt %, and (v) 0.0 to 20 wt %, more particularly 0.0 to 10.0 wt %, preferably in each case 0.0 to 5 wt %, of fillers, additives, and (i) the block copolymer and/or mixtures of copolymers to 100 wt % in the total composition of the adhesives, the copolymer being present preferably at greater than or equal to 30 to 80 wt % in the adhesive, more preferably at 30 to 60 wt %, preferably 30 to 50 wt %. It is preferred here if the polymeric A blocks and optionally A' blocks and the polymeric B blocks and optionally B' blocks are here present in each case as domains.

Finding application as (pressure-sensitive) adhesives are preferably those based on block copolymers comprising polymer blocks predominantly formed by polymerization of vinylaromatics (A blocks), preferably styrene, and those predominantly formed by polymerization of alkenes or 1,3-dienes (B blocks) such as, for example, ethylene, propylene, butadiene, isobutylene, and isoprene, or a copolymer of butadiene and isoprene. The products here may also be hydrogenated partly or fully in the alkene block or diene block. Particularly preferred are block copolymers of polystyrene and at least partly hydrogenated polybutadiene and/or of polystyrene and polyisobutylene.

The block copolymers resulting from the A blocks and B blocks may in each case independently comprise identical or different A blocks and also different B blocks. For example, the block copolymers may have linear A-B-A structures. Likewise employable are block copolymers of radial architecture, and also star-shaped and linear multiblock copolymers such as triblock polymers or higher block polymers. Further components present may be A-B diblock copolymers (two-block copolymers). All of the aforementioned polymers may be used alone or in a mixture with one another.

In place of the preferred polystyrene blocks as A block, A' block, polymer blocks based on other aromatics-containing homopolymers and copolymers (preferably $C_8$ to $C_{12}$ aromatics), with glass transition temperatures of more than 75° C., may be used as vinylaromatics, such as α-methylstyrene-containing aromatic blocks, for example. Furthermore, there may also be identical or different A blocks included.

Hydrogenated vinylaromatic block copolymers are known commercially, for example, under the name Kraton from Kraton as styrene-ethylene/butylene-styrene block copolymers, or under the name Septon from Kuraray as styrene-ethylene/propylene-styrene block copolymers.

In one advantageous embodiment, the copolymers, more particularly block copolymers, have a polyvinylaromatic fraction of 10 wt % to 35 wt %. This is true both of the sulfonated copolymers and also, independently thereof, of the unsulfonated copolymers.

At least some of the copolymers used here, preferably block copolymers, are sulfonated in the vinylaromatic moiety, more particularly with sulfonic acid or with a sulfonic acid derivative, preferably an ester. The sulfonation of the aromatics of the A blocks may be accomplished here in a variety of ways. One possibility, for example, is that of direct sulfonation with concentrated sulfuric acid, or chlorosulfonation with sulfuryl chloride and subsequent hydrolysis of the chlorosulfonic acid. Very simple and elegant is the reaction with acetyl or isopropyl sulfate prepared in situ.

In another preferred embodiment, the fraction of the polymeric A blocks in the block copolymers is at least 13 wt % in relation to the total mass of the block copolymers. In an alternative preferred embodiment, the fraction of the copolymers, preferably of block copolymers, such as of the vinylaromatic block copolymers, is in total at least 20 wt %, preferably at least 30 wt %, more preferably at least 35 wt %, based on the overall (pressure-sensitive) adhesive. A consequence of too low a fraction of vinylaromatic block copolymers is that the cohesion of the PSA is relatively low. The maximum fraction of the vinylaromatic block copolymers in total, based on the overall PSA, is 80 wt % at most, preferably 65 wt % at most, very preferably 60 wt % at most. Too high a fraction of vinylaromatic block copolymers has the consequence, in turn, that the PSA is barely still tacky.

As a result of the chelate crosslinking and of the fraction of hard blocks, the adhesives of the invention have very good values for Shear Adhesion Failure Temperature (SAFT). Accordingly, for the adhesives of the invention, it is possible to achieve SAFT values of greater than or equal to 150° C., more particularly greater than or equal to 180° C., preferably greater than or equal to 200° C., very preferably greater than or equal to 210° C., up to preferably at least 250° C., depending on the crosslinking and on the fraction of hard blocks.

Preferred adhesives therefore have a fraction in wt % of the vinylaromatics of the polymeric A blocks and A' blocks in the (i) block copolymer, in relation to the overall composition of the adhesive, of at least 13 to 85 wt %, preferably 20 to 80 wt %, more preferably between greater than or equal to 30 to less than or equal to 60 wt %. The amount must not be too high, in order to ensure sufficient pressure-sensitive adhesiveness.

Preferred B and B' blocks comprise, independently, homopolymers or copolymers of monomeric alkenes having 2 to 8 C atoms, the monomers being preferably selected from ethylene, propylene, 1,3-dienes, more preferably from butadiene, isobutene and/or isoprene. For the success according to the invention it is particularly preferred here if the polymeric B and B' blocks are at least partly hydrogenated, more particularly substantially fully hydrogenated. A preferably full hydrogenation of the B blocks prevents sulfonation of the B blocks, allowing an adhesive with good transparency to be produced. Examples of suitable apolar comonomers of the copolymer B blocks are (partially) hydrogenated polybutadiene, (partially) hydrogenated polyisoprene and/or polyolefins.

Used with preference as at least one metal complex with a substitutable complexing agent is, as metal complex, a metal chelate of the formula I, $(R^1O)_n M(XR^2Y)_m$       (I)

where M is a metal selected from metals from main groups 2, 3, 4, and 5 of the Periodic Table and from the transition metals, M being selected more particularly from aluminum, tin, titanium, zirconium, hafnium, vanadium, niobium, chromium, manganese, iron, cobalt, and cerium, and M more preferably being aluminum or titanium, and $R^1$ is an alkyl or aryl group, more particularly having 1 to 12 C atoms, such as methyl, ethyl, butyl, isopropyl, or benzyl, n is 0 or a larger integer, more particularly 0, 1, 2, 3, or 4, n preferably being 0 or 1, X and Y in the chelate ligand (XR$^2$Y) are independently oxygen or nitrogen, which are optionally bonded with a double bond to R$^2$, preferred chelate ligands being diones, such as 2,4-pentanedione, R$^2$ is an alkylene group joining X and Y, more particularly a bifunctional alkylene group, which is linear or branched, and optionally with heteroatom(s) in the alkylene group, more particularly oxygen, nitrogen, or sulfur, m is an integer, but is at least 1, more particularly a number selected from 1, 2, or 3. In preferred metal chelates, M is selected from aluminum, titanium, and zirconium, n is 0, 1, 2, or 3, and m is 1, 2, 3, or 4.

Preferred chelate ligands are those which have come about from the reaction of the following compounds: triethanolamine, 2,4-pentanedione, 2-ethyl-1,3-hexanediol, or lactic acid. Particularly preferred crosslinkers are aluminum acetylacetonates and titanyl acetyl-acetonates. Such as tris(acetylacetonato)aluminum, bis(acetylacetonato)titanium(IV) oxide, bis(pentane-2,4-dionato)titanium(IV) oxide.

Here, in order to achieve optimum crosslinking, an approximately equivalent ratio ought to be selected between the sulfonic acid/sulfonic acid derivative groups and the acetylacetonate groups, with a small excess of crosslinker having been found to be positive. The ratio between sulfonic acid or sulfonic acid derivative groups and acetylacetonate groups may be varied, however, in which case, for sufficient crosslinking, neither of the two groups ought to be present in more than a fivefold molar excess. The invention preferably provides an adhesive in which the molar ratio of the sulfonic acid groups in the (i) sulfonated copolymer to the ligand (XR$^2$Y), more particularly to an acetylacetonate ligand, in the (iii) metal complex of the formula I is in the range from 1:5 to 5:1, including the limiting values, more particularly in the range from 1:3 to 3:1, more particularly 1:2 to 2:1, preferably around 1:1 with a fluctuation range of plus/minus 0.5, more particularly 0.2.

In further-preferred embodiment, the PSA, in addition to the at least one vinylaromatic block copolymer, has at least one tackifier resin, in order to increase the adhesion in a desired way. The tackifier resin ought to be compatible with the elastomer block of the block copolymers.

Employed as tackifier resins (tackifiers) in the PSA may be, for example, unhydrogenated, partially hydrogenated, or fully hydrogenated resins based on rosin and rosin derivatives, hydrogenated polymers of dicyclopentadiene, unhydrogenated or partially, selectively, or fully hydrogenated hydrocarbon resins based on C$_5$, C$_5$/C$_9$, or C$_9$ monomer streams, polyterpene resins based on α-pinene and/or β-pinene and/or δ-limonene, hydrogenated polymers of preferably pure C$_8$ and C$_9$ aromatics. Aforementioned tackifier resins may be used either alone or in a mixture. Resins solid or liquid at room temperature may equally be employed.

Typically utilized as further additives may be the following:
  plasticizing agents such as, for example, plasticizer oils or low molecular mass liquid polymers such as, for example, low molecular mass polybutenes
  primary antioxidants such as, for example, sterically hindered phenols
  secondary antioxidants such as, for example, phosphites or thioethers
  in-process stabilizers such as, for example, C radical scavengers
  light stabilizers such as, for example, UV absorbers or sterically hindered amines
  processing assistants
  endblock reinforcer resins, and
  optionally further polymers of preferably elastomeric kind; elastomers utilizable accordingly include, among others, those based on pure hydrocarbons, as for example unsaturated polydienes such as natural or synthetically generated polyisoprene or polybutadiene, elastomers with substantial chemical saturation, such as, for example, saturated ethylene-propylene copolymers, α-olefin copolymers, polyisobutylene, butyl rubber, ethylene-propylene rubber, and also chemically functionalized hydrocarbons such as, for example, halogen-containing, acrylate-containing, allyl or vinyl ether-containing polyolefins.

In one embodiment of the present invention, the PSA also comprises fillers; mentioned by way of example, but without imposing any restriction, may be metal oxides, metal hydroxides, carbonates, nitrides, halides, carbides, or mixed oxide/hydroxide/halide compounds of the metals selected from aluminum, silicon, zirconium, titanium, tin, zinc, iron, or of the alkali and alkaline earth metals. These are essentially clay earths, examples being aluminum oxides, boehmite, bayerite, gibbsite, diaspore, and the like. Especially suitable are phyllosilicates such as, for example, bentonite, montmorillonite, hydrotalcite, hectorite, kaolinite, boehmite, mica, vermiculite, or mixtures thereof. Carbon blacks or other modifications of carbon, for instance carbon nanotubes, may also be used, however. The fillers are not mandatory—the adhesive works even without their addition individually or in any desired combination.

The fraction is preferably at least 5 wt %, more preferably at least 10 wt %, and very preferably at least 15 wt %.

According to one preferred embodiment of the invention, the fraction of fillers does not exceed a figure of 30 wt %, in order to minimize their effect on the adhesive properties.

In the area of adhesives, particular features of PSAs are their permanent tack and flexibility. A material which exhibits permanent tack must at any point in time have a suitable combination of adhesive and cohesive properties. For good adhesion properties it is necessary to formulate PSAs in such a way that there is an optimum balance of adhesive and cohesive properties.

The adhesive is preferably a PSA, in other words a viscoelastic composition which remains permanently tacky and adhesive in the dry state at room temperature. Bonding is accomplished by gentle applied pressure to virtually all substrates. The copolymer or copolymers, according to one preferred embodiment of the invention, are random, alternating, block, star and/or graft copolymers having a molar mass M$_w$ (weight average) of 300 000 g/mol or less, preferably 200 000 g/mol or less. Smaller molar weights are preferable here, on account of their greater ease of processing.

It is advantageous if the at least one block copolymer is a triblock copolymer constructed from two terminal hard blocks and a middle soft block. Diblock copolymers are likewise readily suitable, as are mixtures of triblock and diblock copolymers.

The PSA may be produced and processed from solution, from dispersion, and from the melt. Production and processing take place preferably from solution or from the melt. Particularly preferred is the manufacture of the adhesive from solution.

Likewise provided by the invention are two-dimensional bonding agents comprising the adhesive of the invention, the sheetlike bonding agent being selected from a sheetlike element of the adhesive, more particularly in the form of an adhesive transfer tape, preferably as a sheetlike element of the adhesive with a coat at least partly covering the sheetlike element, with the adhesive being substantially dried. The sheetlike bonding agent, more particularly a sheetlike element of the adhesive, may also be an adhesive tape, in which case the adhesive tape has a carrier, more particularly a sheetlike carrier, and the applied adhesive is at least on one side of the carrier, and the adhesive is substantially dried. The stated adhesive tape may be a single-sided or double-sided adhesive tape. For greater ease of production, storage, and processing, adhesive transfer tapes customarily have a release paper. With particular advantage, the adhesive of the invention can be used in a single- or double-sided adhesive tape. This type of presentation allows particularly simple and uniform application of the adhesive.

The general expression "adhesive tape" here encompasses a carrier material which has been provided on one or both sides with a (pressure-sensitive) adhesive. The carrier material embraces all sheetlike structures, examples being two-dimensionally extended sheets or sheet sections, tapes with extended length and limited width, tape sections, diecuts (in the form, for example, of surrounds or borders of an (opto) electronic arrangement), multilayer arrangements, and the like. For different applications, any of a very wide variety of different carriers may be combined, such as films, fabrics, nonwovens, and papers, for example, with the adhesives. Furthermore, the expression "adhesive tape" also encompasses what are called "adhesive transfer tapes", in other words an adhesive tape without carrier. In the case of an adhesive transfer tape, the adhesive is instead applied prior to application between flexible liners, which have been provided with a release coat and/or which have antiadhesive properties. For application, generally one liner is first removed, the adhesive is applied, and then the second liner is removed.

Also possible, however, are adhesive tapes operated not with two liners, but instead with a single, double-sidedly release-furnished liner. The adhesive tape web is then covered on its front face with one side of a double-sidedly release-furnished liner, its reverse face with the reverse side of the double-sidedly release-furnished liner, more particularly of an adjacent winding on a bale or a roll.

Carrier material used for an adhesive tape is presently preferably polymer films, film composites, nonwovens, wovens, papers, foams, or films or film composites provided with organic and/or inorganic layers. Such films/film composites may consist of all common plastics used for producing films, examples—but without restriction—including the following: polyethylene, polypropylene—especially the oriented polypropylene (OPP) generated by monoaxial or biaxial stretching, cyclic olefin copolymers (COC), polyvinyl chloride (PVC), polyesters—especially polyethylene terephthalate (PET) and polyethylene naphthalate (PEN), ethylene-vinyl alcohol (EVOH), polyvinylidene chloride (PVDC), polyvinylidene fluoride (PVDF), polyacrylonitrile (PAN), polycarbonate (PC), polyamide (PA), polyethersulfone (PES), or polyimide (PI).

The carrier, moreover, may have been combined with organic or inorganic coatings or coats. This may be done by means of customary methods such as, for example, varnishing, printing, vapor coating, sputtering, coextruding, or laminating. By way of example, but without restriction, mention may be made here, for instance, of oxides or nitrides of silicon and of aluminum, indium-tin oxide (ITO), or sol-gel coatings.

In the case of double-sidedly (self-)adhesive tapes, adhesives of the invention that are the same or different, and/or with the same or different layer thickness, may be employed as the top and bottom layers. The carrier in this case may have been pretreated in accordance with the prior art on one or both sides, to obtain, for example, an improvement in adhesive anchoring. It is also possible for one or both sides to have been furnished with a functional layer which is able to function, for example, as a barrier layer. The PSA layers may optionally be lined with release papers or release films. Alternatively only one layer of adhesive may have been lined with a double-sidedly releasing liner. In one variant, the double-sidedly (self-)adhesive tape comprises an adhesive of the invention and also any desired further adhesive, an example being one which adheres particularly well to a masking substrate, or exhibits particularly good repositionability.

The invention likewise provides a process for producing an adhesive, more particularly a temperature-stable pressure-sensitive adhesive, and also an adhesive obtainable by the process, more particularly a temperature-stable adhesive, which comprises combining
(i) block copolymers and also mixtures thereof, having a construction A-B-A, $(A-B)_n$, $(A-B)_nX$, or $(A-B-A)_nX$, where X is the radical of a coupling reagent, n is an integer between 2 and 10, A is a polymer block of a vinylaromatic, and B is a polymer block of an alkene or diene, and at least some of the A blocks are sulfonated, and optionally as an admixture component comprises diblock copolymers of the form A-B, and
(ii) at least one tackifier resin, and
(iii) at least one metal complex with a substitutable complexing agent.

In one preferred process variant, the block copolymer has A blocks derived from vinylaromatics and B blocks derived from alkenes and dienes selected from linear or branched alkenes having 2 to 8 C atoms, with B blocks being at least partly, preferably fully, hydrogenated, and with the aromatics of the A blocks being at least partly sulfonated. A polymer is considered to be fully hydrogenated when the amount of double bonds is less than 5 mol % in relation to mol % of monomers employed.

Likewise provided by the invention is the use of an adhesive of the invention and also the process product of the aforementioned process, wherein the adhesive is partially crosslinked prior to application or is partially crosslinked or crosslinked to completion after an application, more particularly by heating of the adhesive and/or of the element before, during, or after the application of the adhesive on the element.

Also provided by the invention, furthermore, is the use of an adhesive or of a single-sided or double-sided adhesive tape formed with the adhesive, especially in the form of a temperature-stable adhesively bonded assembly, more particularly with a SAFT value of greater than or equal to 180° C., more particularly greater than or equal to 200° C.

BRIEF DESCRIPTION OF THE DRAWINGS

Further details, aims, features, and advantages of the present invention will be elucidated in more detail below with reference to a number of figures, which represent preferred exemplary embodiments. Here

Figure 1:
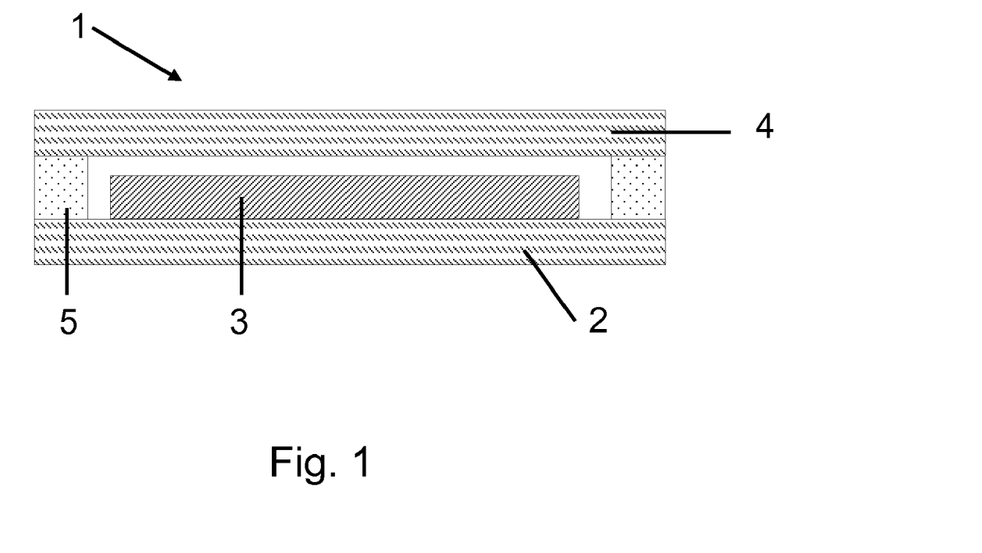
FIG. 1 shows a first (opto)electronic arrangement in diagrammatic representation.

FIG. 1 shows a first embodiment of an (opto)electronic arrangement 1. This arrangement 1 has a substrate 2 on which an electronic structure 3 is disposed. The substrate 2 itself is designed as a barrier for permeants and thus forms part of the encapsulation of the electronic structure 3. Disposed above the electronic structure 3, in the present case also at a distance from it, is a further cover 4 designated as a barrier.

In order to encapsulate the electronic structure 3 to the side as well and at the same time to join the cover 4 to the electronic arrangement 1 in its remaining part, a pressure-sensitive adhesive (PSA) 5 runs round adjacent to the electronic structure 3 on the substrate 2. In other embodiments the encapsulation is accomplished not with a pure PSA 5, but instead with an adhesive tape 5 which comprises at least one PSA of the invention. The PSA 5 joins the cover 4 to the substrate 2. By means of an appropriately thick embodiment, moreover, the PSA 5 allows the cover 4 to be distanced from the electronic structure 3.

The PSA 5 is of a kind based on the PSA of the invention as described above in general form and set out in more detail below in exemplary embodiments. In the present case, the PSA 5 not only takes on the function of joining the substrate 2 to the cover 4, but also, furthermore, forms a barrier layer for permeants, in order thus to encapsulate the electronic structure 3 from the side as well with respect to permeants such as water vapor and oxygen.

In the present case, furthermore, the PSA 5 is provided in the form of a diecut comprising a double-sidedly adhesive tape. A diecut of this kind permits particularly simple application.

Figure 2:
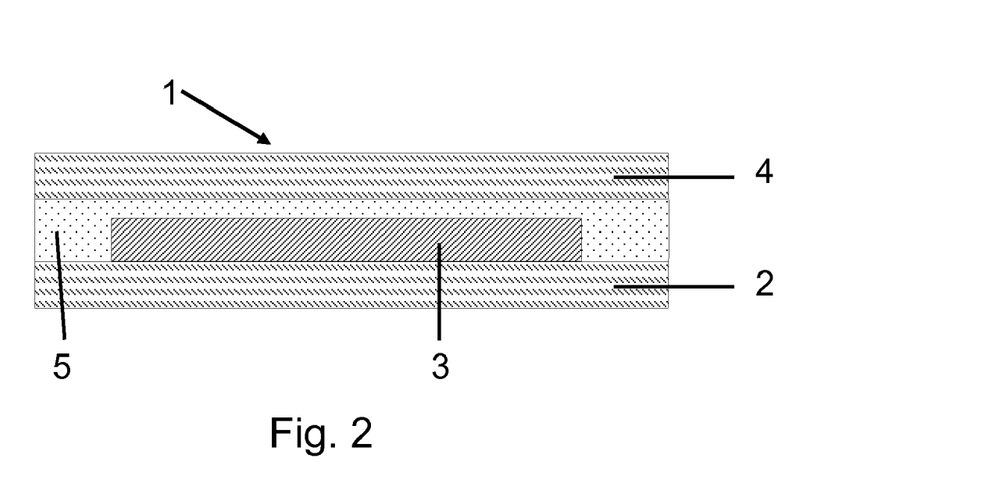
FIG. 2 shows a second (opto)electronic arrangement in diagrammatic representation.

FIG. 2 shows an alternative embodiment of an (opto)electronic arrangement 1. Shown, again, is an electronic structure 3 which is disposed on a substrate 2 and is encapsulated by the substrate 2 from below. Above and to the side of the electronic structure, the PSA 5 is now in a full-area disposition. The electronic structure 3 is therefore encapsulated fully from above by the PSA 5. A cover 4 is then applied to the PSA 5. This cover 4, in contrast to the previous embodiment, need not necessarily fulfill the high barrier requirements, since the barrier is provided by the PSA itself. The cover 4 may merely, for example, take on a mechanical protection function, or else may also be provided as a permeation barrier.

Figure 3:
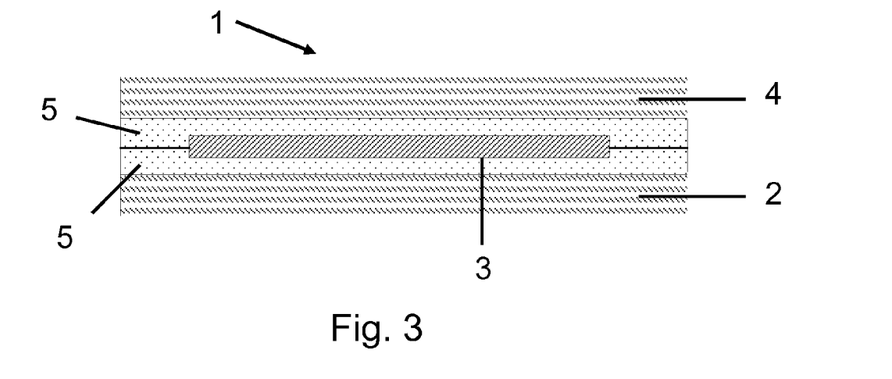
FIG. 3 shows a third (opto)electronic arrangement in diagrammatic representation.

FIG. 3 shows a further alternative embodiment of an (opto) electronic arrangement 1. In contrast to the previous embodiments, there are now two PSAs 5a, 5b, which in the present case are identical in configuration. The first PSA 5a is disposed over the full area of the substrate 2. The electronic structure 3 is provided on the PSA 5a, and is fixed by the PSA 5a. The assembly comprising PSA 5a and electronic structure 3 is then covered over its full area with the further PSA 5b, with the result that the electronic structure 3 is encapsulated on all sides by the PSAs 5a, b. Provided above the PSA 5b, in turn, is the cover 4.

In this embodiment, therefore, neither the substrate 2 nor the cover 4 need necessarily have barrier properties. Nevertheless, they may also be provided, in order to restrict further the permeation of permeants to the electronic structure 3.

In relation to FIG. 2, 3 in particular it is noted that in the present case these are diagrammatic representations. From the representations it is not apparent in particular that the PSA 5, here and preferably in each case, is applied with a homogeneous layer thickness. At the transition to the electronic structure, therefore, there is not a sharp edge, as it appears in the representation, but instead the transition is fluid and it is possible instead for small unfilled or gas-filled regions to remain. If desired, however, there may also be conformation to the substrate, particularly when application is carried out under vacuum or under increased pressure. Moreover, the PSA is compressed to different extents locally, and so, as a result of flow processes, there may be a certain compensation of the difference in height at the edge structures. The dimensions shown are also not to scale, but instead serve rather only for more effective representation. In particular, the electronic structure itself is usually of relatively flat design (often less than 1 µm thick).

In all of the exemplary embodiments shown, the PSA 5 is applied in the form of a pressure-sensitive adhesive tape. This may in principle be a double-sided pressure-sensitive adhesive tape with a carrier, or may be an adhesive transfer tape. In the present instance, an adhesive transfer tape embodiment is selected.

The thickness of the PSA, present either as an adhesive transfer tape or as a coating on a sheetlike structure, is preferably between about 1 µm and about 150 µm, more preferably between about 5 µm and about 75 µm, and very preferably between about 12 µm and 50 µm. High layer thicknesses of between 50 µm and 150 µm are employed when the aim is to achieve improved adhesion to the substrate and/or a damping effect within the (opto)electronic construction. A disadvantage here, however, is the increased permeation cross section. Low layer thicknesses of between 1 µm and 12 µm reduce the permeation cross section, and hence the lateral permeation and the overall thickness of the (opto)electronic construction. However, there is a reduction in the adhesion on the substrate. In the particularly preferred thickness ranges, there is a good compromise between low thickness of composition and the consequent low permeation cross section, which reduces the lateral permeation, and a sufficiently thick film of composition to produce a sufficiently adhering bond. The optimum thickness is dependent on the (opto)electronic construction, on the end application, on the nature of the embodiment of the PSA, and, possibly, on the sheetlike substrate.

For double-sided adhesive tapes it is likewise the case, for the barrier adhesive or adhesives, that the thickness of the individual layer or layers of PSA is preferably between about 1 µm and about 150 µm, further preferably between about 5 µm and about 75 µm, and more preferably between about 12 µm and 50 µm. If a further barrier adhesive is used in double-sided adhesive tapes as well as the barrier adhesive of the invention, then it may also be advantageous for the thickness of said further barrier adhesive to be more than 150 µm.

The invention is elucidated in more detail below by means of a number of examples, without thereby wishing to restrict the invention.

Test Methods

Glass Transition Point ($T_g$)—

The glass transition point ($T_g$) of polymers and copolymers can be determined via Differential Scanning calorimetry, in the manner described in DIN 53765. For this determination, 7 mg of the sample are weighed out accurately into an aluminum crucible and then introduced into the measuring instrument (instrument: DSC 204 F1, Netzsch). An empty crucible is used as a reference. Then two heating curves are recorded, with a heating rate of 10 K/min. The $T_g$ is determined from the second heating curve. The evaluation is made via the instrument software.

Bond Strength—

The bond strength was determined as follows: The defined substrates used were glass plates (float glass). The bondable sheetlike element under investigation was cut to a width of 20 mm and a length of about 25 cm, and was provided with a handling section, and immediately thereafter was pressed onto the selected substrate five times, using a 4 kg steel roller with a rate of advance of 10 m/min. Immediately thereafter, the above-bonded sheetlike element was peeled from the substrate at an angle of 180° at room temperature and at 300 mm/min, using a tensile testing instrument (from Zwick), and the force required to achieve this was recorded. The measurement value (in N/cm) was obtained as the average value from three individual measurements. Testing took place on non-crosslinked specimens.

Shear Adhesion Failure Temperature (SAFT)—

The SAFT was determined as follows: The defined substrate used was a polished steel surface. The bondable sheetlike element under investigation was cut to a width of 10 mm and a length of about 5 cm, and immediately thereafter was pressed onto the selected substrate, having an area of 10×13 mm, three times, using a 2 kg steel roller with a rate of advance of 10 m/min. Immediately thereafter, the above-bonded sheetlike element was loaded at an angle of 180° with 0.5 N, and a temperature ramp of 9° C./min was run. During this procedure, a measurement was made of the temperature at which the sample traveled a slip distance of 1 mm. The measurement value (in ° C.) is obtained as the average value from two individual measurements.

Molecular Weight—

The average molecular weight $M_w$ (weight average) is determined by means of gel permeation chromatography (GPC). The eluent used is THF with 0.1 vol % of trifluoroacetic acid. Measurement takes place at 25° C. The preliminary column used is a PSS-SDV, 5 μm, $10^3$ Å, ID 8.0 mm×50 mm. Separation takes place using the columns PSS-SDV, 5 μm, $10^3$ Å, $10^5$ Å, and $10^6$ Å, each with ID 8.0 mm×300 mm. The sample concentration is 4 g/l, the flow rate 1.0 ml per minute. Measurement is made against PS standards.

EXAMPLES

General Preparation Examples

Sulfonation

Set out below are general examples of possible sulfonation techniques:

a) A 10% (w/v) solution of SIBS (50 g) in methylene chloride (500 ml) is prepared. The solution is stirred and is heated to about 40° C. under reflux in a nitrogen atmosphere. Acetyl sulfate as sulfonating agent is prepared in methylene chloride. For this purpose, 150 ml of methylene chloride are prepared in an ice bath. Then acetic anhydride is introduced in line with the desired degree of sulfonation. The acetic anhydride is added with a 1.5:1 molar ratio to the concentrated sulfuric acid in excess. The concentrated sulfuric acid is then added slowly via a dropping funnel, with stirring. The mixture is subsequently homogenized for about 10 minutes. At this stage there must be no coloration. The acetyl sulfate solution is then transferred in turn into a dropping funnel, and is added slowly dropwise over 10 to 30 minutes to the hot polymer solution. After about 5 hours, the reaction is ended by slow addition of 100 ml of methanol. The reacted polymer solution is then precipitated from deionized water. The precipitate is washed a number of times with water and then dried at 50° C. in a vacuum oven for 24 hours.

b) Derived from U.S. Pat. No. 3,642,953 A is the following technique: SIBS as a block copolymer with average block molecular weights of 10 000-127 000-10 000 (14.3 g) was dissolved in dry diethyl ether (1000 g), filtered, and cooled to 0° C. Added slowly to the polymer solution was a mixture of 8.8 g of chlorosulfonic acid, taken up in 100 g of dry diethyl ether. The reaction temperature was held at 0° C. to 5° C. for 30 minutes. During this time, the polymer is precipitated from the solution, and hydrogen chloride is produced. At the end of the reaction time, the mixture was warmed to room temperature, the ether was decanted from the product, and the precipitated product was washed three times with ether. The two aforementioned techniques can be applied, with modification where appropriate, in principle to all sulfonations according to the invention. The invention also provides copolymers comprising sulfonated copolymers obtainable by the aforementioned techniques in a mixture with unsulfonated copolymers.

Production of the Specimens—

The PSAs in examples 1 to 3 were prepared from solution. For this purpose, the individual constituents were dissolved in THF/toluene/methanol 80/10/10 (solids fraction 40%) and the solution was coated onto an untreated 23 μm PET film and dried at 120° C. for 15 minutes, to give a layer of adhesive having a weight per unit area of 50 g/m².

Example 1

A 10% (w/v) solution of SIBS Sibstar 103T (50 g) in methylene chloride (500 ml) is prepared. The solution is stirred and is heated to about 40° C. under reflux in a nitrogen atmosphere. Acetyl sulfate as sulfonating agent is prepared in methylene chloride. For this purpose, 150 ml of methylene chloride are prepared in an ice bath. Then 2.57 g of acetic anhydride are introduced correspondingly. The acetic anhydride is added to the concentrated sulfuric acid in excess. 1.41 g of concentrated sulfuric acid are subsequently added slowly via a dropping funnel, with stirring. The mixture is then homogenized for about 10 minutes. During this time there must be no coloration. The acetyl sulfate solution is then added slowly dropwise over 10 to 30 minutes to the hot polymer solution. After about 5 hours, the reaction is ended by slow addition of 100 ml of methanol. The reacted polymer solution is then precipitated in cold methanol. The precipitate is washed a number of times with methanol and water and then dried in a vacuum oven at 80° C. for 24 hours. The sulfonic acid fraction of a polymer prepared in this way is ~7 mol %.

Composition

Example 1

| 70 parts | Kraton G 1650 | Triblock SEBS (styrene-ethylene-butylene-styrene) with 30 wt % block polystyrene content from Kraton sulfonated 12 mol % |
| 30 parts | Kraton G 1657 | SEBS with 13 mol % block polystyrene content and a diblock fraction of 29% from Kraton |
| 130 parts | Regalite 1100 | Hydrogenated HC resin with a softening point of 100° C. from Eastman |
| 30 parts | Regalite R1010 | Liquid hydrogenated hydrocarbon resin from Eastman |
| 2 parts | | Aluminum acetylacetonate |
| 2 parts | | Pentanedione |

Example 2

| 50 parts | Kraton G1652 | SEBS (styrene-ethylene-butylene-styrene) with 30 wt % block polystyrene content from Kraton sulfonated 7 mol % |
| 50 parts | Kraton G 1657 | SEBS with 13 mol % block polystyrene content from Kraton and with a diblock fraction of 29%, sulfonated to 9 mol % |

-continued

| 130 parts | Escorez 5600 | Hydrogenated HC resin with a softening point of 100° C. from Exxon |
| 25 parts | Ondina G 49 | White oil comprising paraffinic and naphthenic fractions, from Shell |
| 2 parts | | Aluminum acetylacetonate |
| 2 parts | | Pentanedione |

Example 3

| 50 parts | Septon 4033 | Triblock SEEPS with 30 wt % block polystyrene content from Kuraray sulfonated with 7 mol % |
| 50 parts | Septon 2063 | Triblock SEPS with 13 wt % block polystyrene content from Kuraray |
| 120 parts | Foralyn 90 | Hydrogenated rosin having a softening point of 90° C. from Eastman |
| 1 part | | Aluminum acetate |
| 1 part | | Pentanedione |

Composition

Comparative Example 1

| 70 parts | Kraton G 1650 | Triblock SEBS (styrene-ethylene-butylene-styrene) with 30 wt % block polystyrene content from Kraton |
| 30 parts | Kraton G 1657 | SEBS with 13 mol % block polystyrene content and a diblock fraction of 29% from Kraton |
| 130 parts | Regalite 1100 | Hydrogenated HC resin with a softening point of 100° C. from Eastman |
| 30 parts | Regalite R1010 | Liquid hydrogenated hydrocarbon resin from Eastman |

Comparative Example 2

| 50 parts | Septon 4033 | Triblock SEEPS (styrene-ethylene/(ethylene-propylene)-styrene) with 30 wt % block polystyrene content from Kuraray |
| 50 parts | Septon 2063 | Triblock SEPS with 13 wt % block polystyrene content and 60% diblock fraction from Kuraray |
| 120 parts | Foralyn 90 | Hydrogenated rosin having a softening point of 90° C. from Eastman |
| 1 part | | Aluminum acetate |

TABLE 1

Testing of the examples

| | Bond strength | SAFT |
|---|---|---|
| Example 1 | 5.5 | 210 |
| Example 2 | 5.9 | 210 |
| Example 3 | 4.7 | 210 |
| Comparative Example 1 | 4.8 | 120 |
| Comparative Example 2 | 5.2 | 100 |

As can be seen in the table above, the adhesion of the sulfonated adhesive to polar substrates, and the thermal shear strength, undergo an increase. The measurement was ended at 210° C. since this represents the maximum of the thermal conditioning unit. In contrast, the noncrosslinked systems exhibit the temperature failure, typical of styrene block copolymer, at between 100° C. to 120° C., which is a result of the softening of the styrene domains. As can be perceived, it was possible to achieve sufficient bond strengths on all substrates in all examples, and excellent resistance at elevated temperatures in the case of the examples 1, 2, and 3.

The invention claimed is:

1. An adhesive comprised of
    (i) block copolymers and mixtures thereof, having a construction A-B-A, (A-B)$_n$X, or (A-B-A)$_n$X, where X is the radical of a coupling reagent, n is an integer between 2 and 10, A is a polymer block of a vinylaromatic, and B is a polymer block of an alkene or diene, and the A blocks are sulfonated to the extent of between 0.5 to 50 mol %, based on the total monomer units of the A blocks, and optionally diblock copolymers of the form A-B, and
    (ii) at least one tackifier resin, and
    (iii) at least one metal complex with a substitutable complexing agent.

2. The adhesive as claimed in claim 1, wherein the polymer blocks B are at least partly hydrogenated.

3. The adhesive as claimed in claim 1 wherein (i) 0.5 to 50 mol % of the block copolymers are in the form of sulfonated copolymers having sulfonated chelate-crosslinked A blocks.

4. The adhesive as claimed in claim 1, wherein (i) the A blocks each independently have a $T_g$ of more than 40° C. and the B blocks each independently have a $T_g$ of less than 0° C.

5. The adhesive as claimed in claim 1, wherein the B blocks independently are a homopolymer or copolymer of monomeric alkenes having 2 to 8 C atoms.

6. The adhesive as claimed in claim 1, wherein the block copolymers have a molar mass $M_w$ (weight average) of less than or equal to 300 000 g/mol.

7. The adhesive as claimed in claim 1, wherein the A blocks are a homopolymer or copolymer of monomers selected from the group consisting of vinylaromatics and derivatives of vinylaromatics.

8. The adhesive as claimed in claim 1, wherein the metal complex with a substitutable complexing agent corresponds to a metal chelate of the formula I, $$(R^1O)_nM(XR^2Y)_m \quad (I)$$

where M is a metal selected from the group consisting of metals from main groups 2, 3, 4, and 5 of the Periodic Table and from the transition metals, and
$R^1$ is an alkyl or aryl group,
n is 0 or a larger integer,
X and Y in the chelate ligand (XR²Y) are independently oxygen or nitrogen, which are optionally bonded by a double bond to $R^2$,
$R^2$ is an alkylene group which joins X and Y and which is linear or branched, optionally with heteroatom(s) in the alkylene group.

9. The adhesive as claimed in claim 8, wherein the chelate ligand in the metal chelate is formed from the reaction of at least one of the compounds selected from the group consisting of triethanolamine, 2,4-pentanedione, 2-ethyl-1,3-hexanediol, and lactic acid.

10. The adhesive as claimed in claim 1, wherein the sulfonated copolymer has sulfonated A blocks in which greater than or equal to 0.5 mol % of the aromatics are sulfonated per mole of the monomer unit, based on the total monomer units of the A blocks of the sulfonated copolymers.

11. The adhesive as claimed in claim 1, wherein the sulfonated copolymer has sulfonated A blocks in which greater than or equal to 0.5 to 50 mol % of the aromatics are sulfonated per mole of the monomer unit, based on the total monomer units of the A blocks of the sulfonated copolymers, with a fluctuation range of plus/minus 2 mol %.

12. The adhesive as claimed in claim 1, wherein the overall composition of the adhesive contains
    (ii) at 10 to 60 wt % of at least one tackifier resin, and
    (iii) at least one metal complex with a substitutable complexing agent, and optionally
    (iv) up to 20 wt % of a plasticizer, and
    (v) 0.0 to 20 wt % of fillers, additives, and
    (i) the block copolymer and also mixtures thereof to 100 wt %.

13. The adhesive as claimed in claim 6, wherein the fraction in wt % of the vinylaromatics of the A blocks in the (i) block copolymer in relation to the overall composition of the adhesive is at least 13 to 85 wt %.

14. The adhesive as claimed in claim 8, wherein the molar ratio of the sulfonic acid groups in the (i) sulfonated copolymer to the ligand $(XR^2Y)$ in the (iii) metal complex of the formula I is in the range from 1:3 to 3:1, with a fluctuation range of plus/minus 0.5.

15. The adhesive as claimed in claim 1, having a SAFT value of greater than or equal to 150° C.

16. A process for producing a temperature-stable pressure-sensitive adhesive, by combining
    (i) block copolymers and also mixtures thereof, having a construction A-B-A, $(A-B)_nX$, or $(A-B-A)_nX$, where X is the radical of a coupling reagent, n is an integer between 2 and 10, A is a polymer block of a vinylaromatic, and B is a polymer block of an alkene or diene, and at least some of the A blocks are sulfonated, and optionally as an admixture component comprises diblock copolymers of the form A-B, and
    (ii) at least one tackifier resin, and
    (iii) at least one metal complex with a substitutable complexing agent.

17. The process as claimed in claim 16, wherein the block copolymers comprise A blocks derived from vinylaromatics and B blocks derived from linear or branched alkenes having 2 to 8 C atoms, the B blocks being at least partly hydrogenated, and the aromatics of the A blocks being at least partly sulfonated.

18. An adhesive obtainable by a process of claim 16.

19. A method of applying the adhesive of claim 1 to an element, wherein the adhesive prior to application is partly crosslinked or after the application is partly crosslinked or crosslinked to completion by heating of the adhesive and/or of the element before, during, or after the application of the adhesive to the element.

20. The method of claim 19, wherein the adhesive has a SAFT value of greater than or equal to 180° C.

21. A sheetlike bonding means comprising the adhesive of claim 1, the sheetlike bonding means being selected from the group consisting of a sheetlike element of the adhesive and an adhesive tape, the adhesive tape comprising a backing with the adhesive applied to at least one side of the backing, and the adhesive of the sheetlike bonding agent being substantially dried.

* * * * *